(12) United States Patent
Chang et al.

(10) Patent No.: US 8,082,400 B1
(45) Date of Patent: Dec. 20, 2011

(54) PARTITIONING A MEMORY POOL AMONG PLURAL COMPUTING NODES

(75) Inventors: Jichuan Chang, Mountain View, CA (US); Parthasarathy Ranganathan, Fremont, CA (US); Kevin T. Lim, Ann Arbor, MI (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 738 days.

(21) Appl. No.: 12/243,657

(22) Filed: Oct. 1, 2008

Related U.S. Application Data

(60) Provisional application No. 61/031,378, filed on Feb. 26, 2008.

(51) Int. Cl.
*G06F 12/10* (2006.01)
*G06F 15/16* (2006.01)
*G06F 15/167* (2006.01)

(52) U.S. Cl. ........ 711/147; 711/148; 711/153; 711/170; 711/173; 709/213; 709/214; 709/215; 709/216

(58) Field of Classification Search .................. 711/147, 711/148, 153, 170, 173; 709/213, 214, 215, 709/216
See application file for complete search history.

(56) References Cited

U.S. PATENT DOCUMENTS

| | | | | |
|---|---|---|---|---|
| 7,124,071 | B2* | 10/2006 | Rich et al. | 703/16 |
| 7,343,515 | B1* | 3/2008 | Gilbertson et al. | 714/10 |
| 7,363,454 | B2* | 4/2008 | Cannon et al. | 711/170 |
| 7,526,469 | B2* | 4/2009 | Narita et al. | 1/1 |
| 7,802,053 | B2* | 9/2010 | Shiga | 711/114 |
| 2006/0031527 | A1* | 2/2006 | Soles et al. | 709/227 |
| 2008/0177974 | A1* | 7/2008 | Chiang et al. | 711/173 |
| 2009/0013147 | A1* | 1/2009 | Kondajeri et al. | 711/173 |
| 2009/0240880 | A1* | 9/2009 | Kawaguchi | 711/114 |
| 2009/0248990 | A1* | 10/2009 | Sprangle | 711/147 |
| 2009/0271589 | A1* | 10/2009 | Karpoff et al. | 711/170 |
| 2009/0307445 | A1* | 12/2009 | Jacobs et al. | 711/154 |

OTHER PUBLICATIONS

A. Charlesworth, "STARFIRE: Extending the SMP Envelope," IEEE Micro, pp. 39-49 (Jan./Feb. 1998).
K. Harty et al., "Application-Controlled Physical Memory Using External Page-Cache Management," Proceedings of the 5th International Conf. on Architectural Support for Programming Languages and Operating Systems, pp. 187-199 (Oct. 1992).
B. Verghese et al., "OS Support for Improving Data Locality on CC-NUMA Compute Servers," Technical Report: CSL-TR-96-688, Proceedings of the 7th International Conf. on Architectural Support for Programming Lanuages and Operating Systems, pp. 1-31 (Feb. 1996).
M.R. Hines et al., "Distributed Anemone: Transparent Low-Latency Access to Remote Memory," International Conf. on High-Performance Computing (HiPC), pp. 1-12 (Dec. 2006).
M.D. Flouris et al., "The Network RamDisk: Using Remote Memory on Heterogeneous NOWs," Cluster Computing, 2 (4):281-293 (1999).
M.J. Feeley et al., "Implementing Global Memory Management in a Workstation Cluster," Proceedings of the 15th ACM Symposium on Operating Systems Principles, pp. 1-12 (Dec. 1995).

(Continued)

*Primary Examiner* — John Lane

(57) ABSTRACT

To share a memory pool that includes at least one physical memory in at least one of plural computing nodes of a system, firmware in management infrastructure of the system is used to partition the memory pool into memory spaces allocated to corresponding ones of at least some of the computing nodes. The firmware maps portions of the at least one physical memory to the memory spaces, where at least one of the memory spaces includes a physical memory portion from another one of the computing nodes.

23 Claims, 5 Drawing Sheets

OTHER PUBLICATIONS

M.D. Dahlin et al., "A Cooperative Caching: Using Remote Client Memory to Improve File System Performance," Proceedings of the Operating Systems Design and Implementation Conference, pp. 1-14 (Nov. 1994).

C. Waldsburger, "Memory Resource Management in VMWare ESX Server," Proceedings of the 5th Symposium on Operating Systems Design and Implementation, pp. 1-15 (2002).

GemStone Systems, "GemFire Enterprise Data Fabric (EDF)," http://www.gemstone.com/products/gemfire/edf.php, p. 1 (at least as early as Jan. 6, 2008).

B. Fitzpatrick, "Memcached: A Distributed Memory Object Caching System," http://www.danga.com/memcached/, p. 1-4 (at least as early as Jan. 6, 2008).

P. Ranganathan et al., "Ensemble-Level Power Management for Dense Blade Servers," ISCA '06: Proceedings of the 33rd Annual International Symposium on Computer Architecture, pp. 66-77 (2006).

R. Kumar et al., "Heterogeneous Chip Multiprocessors," IEEE Computer Society, IEEE Computer, pp. 32-38 (Nov. 2005).

X. Fan et al., "Power Provisioning for a Warehouse-Sized Computer," Proceedings of the ACM International Symposium on Computer Architecture, pp. 1-11 (Jun. 2007).

QLOGIC, White Paper, "Ethernet: The Drive for Convergence," pp. 1-5 (2007).

A. Reed, "Teak Technologies Previews World's First 10-Gb Congestion-Free Ethernet Switching Solution for IBM BladeCenter," pp. 1-4(May 1, 2007).

K. Tolly et al., "Enterprise-Class Convergence and QoS: Taking It to an Extreme," A Convergence Benchmarking Study commissioned by Extreme Networks, Inc., Document No. 202502, pp. 1-27 (2002).

R. Raghavendra et al., "No 'Power' Struggles: Coordinated Multi-Level Power Management for the Data Center," OSPLOS '08, pp. 1-12 (Mar. 2008).

* cited by examiner

PARTITIONING A MEMORY POOL AMONG PLURAL COMPUTING NODES

CROSS-REFERENCE TO RELATED APPLICATIONS

This patent application claims the benefit of priority under 35 U.S.C. §119(e) to U.S. Provisional patent application Ser. No. 61/031,378, filed Feb. 26, 2008, entitled "Partitioning A Memory Pool Among Plural Computing Nodes," having the same inventors and which is hereby incorporated by reference in its entirety.

BACKGROUND

In a computer system, the amount of memory available often determines the performance of the computer system—the higher the amount of memory available, the higher the performance. However, memory devices are also relatively costly, and can make up a substantial portion of the overall system cost.

In a system that has multiple computing nodes, such as a server system having multiple server nodes, the allocation of memory to the various computing nodes poses a challenge. Various mechanisms have been implemented or proposed to share memory resources among the multiple computing nodes. However, such sharing mechanisms often involve the use of specialized hardware or specialized software, both of which involves additional costs and implementation complexities.

BRIEF DESCRIPTION OF THE DRAWINGS

Some embodiments of the invention are described with respect to the following figures.

DETAILED DESCRIPTION

Figure 1:
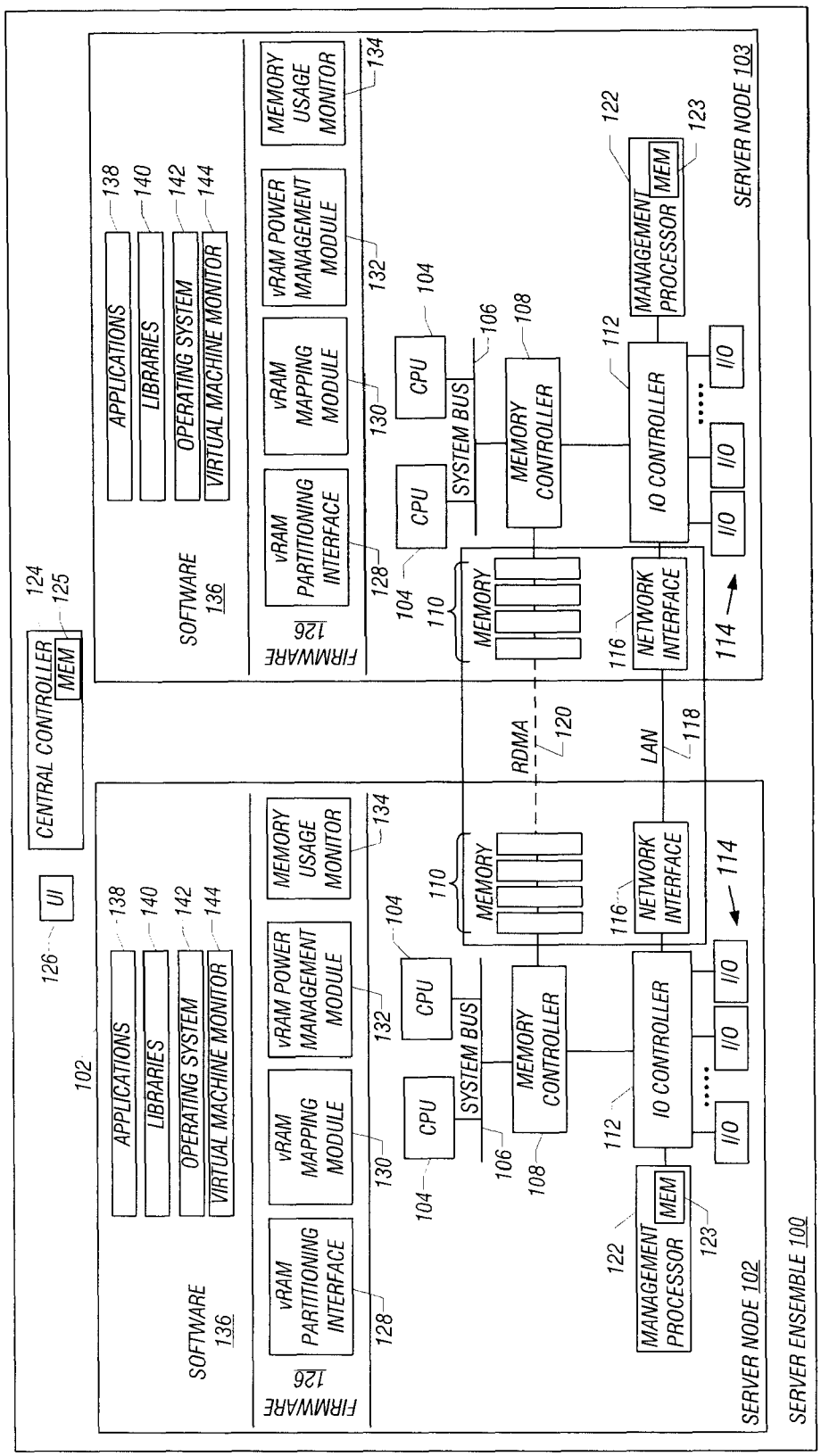
FIG. 1 is a block diagram of an arrangement of a server ensemble that has server nodes and that includes a memory-sharing and partitioning mechanism according to an embodiment.

In accordance with some embodiments, a memory-sharing and partitioning mechanism is provided in a system to allow for more efficient usage of the physical memories in different computing nodes of the system. Each of the computing nodes has local physical memory that is provided in the computing node. The physical memories of the computing nodes together make up a global memory pool that can be shared between the computing nodes. As part of the partitioning according to some embodiments, a given computing node can be allocated a memory space (referred to as a "virtual memory" or "virtual random access memory (vRAM)") that includes at least part of its local physical memory and remote physical memory. Remote physical memory can include portions of one or more physical memories located in one or more remote computing nodes.

The term "virtual memory" as used herein refers to a collection of one or more physical memory portions from one or more computing nodes.

A relatively high-speed interconnection or communications network is provided in the system to enable the computing nodes to communicate with each other at a relatively high speed. This communications network, shared by the computing nodes, is also used for enabling access of a remote physical memory within an allocated virtual memory by a particular computing node, such that sharing of physical memories across multiple computing nodes is made more efficient.

The term "memory" refers to a storage medium that has a higher access speed than a lower-level storage medium such as persistent storage (e.g., disk drives, etc.). A "physical memory" refers to a set of one or more actual memory devices. An example memory device can be a dynamic random access memory (DRAM), synchronous DRAM (SDRAM), flash memory, and so forth.

In an alternative embodiment, instead of partitioning a global memory pool made up of physical memories located in the multiple computing nodes, a global memory pool made up of a relatively large physical memory in a separate standalone computing node (separate from the other computing nodes) can be partitioned. In this embodiment, the multiple computing nodes are considered "participating" nodes, since they participate in the allocation of memory spaces according to the partitioning of the global memory pool. The standalone computing node that includes the large physical memory is separate from the participating computing nodes, and the standalone computing node does not participate in being allocated a memory space from partitioning of the global memory pool.

In yet a further embodiment, the global memory pool is made up of the physical memories of the participating computing nodes, as well as the physical memory of the standalone computing node.

In the ensuing discussion, reference is made to partitioning a global memory pool made up of physical memories of participating computing nodes—note, however, that the described techniques and mechanisms are also applicable to partitioning of a global memory pool made up of physical memory in a standalone computing node, or made up of physical memories both in participating computing nodes and the standalone computing node.

In accordance with some embodiments, partitioning of the global memory pool is performed in a software-transparent manner by using firmware of a management infrastructure of the system. The term "software-transparent" means that the partitioning of the global memory pool is performed without intervention or control by the operating system (and associated components of the operating system, such as device drivers and file systems) and application software of the system. Partitioning the global memory pool in a software independent manner enhances system development efficiency since the operating system and application software do not have to be modified to enable the partitioning.

In one implementation, each of the computing nodes of the system can include a management processor. The firmware for performing memory partitioning can be implemented in one or more of such management processors. The term "firmware" refers to code stored in read-only memory or programmable/erasable read-only memory of a hardware component, such as a processor, microcontroller, programmable gate array, application programming integrated circuit (ASIC), and so forth. Such code stored in the local memory of a hardware component differs from higher-level software code such as the operating system and application software, which are stored in general storage, such as persistent storage or memory of the system, and loaded from such general storage for execution on a processor.

The global memory pool can be arbitrarily partitioned between two or more computing nodes (or groups of computing nodes) in the system, such that different amounts of memories can be allocated to different computing nodes having different workloads. Each partition is referred to as a virtual memory, which can be larger than a computing node's locally-installed physical memory. In some embodiments, there is a one-to-one correspondence between each virtual memory and a corresponding computing node, such that the virtual memory allocated to a particular computing node is not shareable or accessible by another computing node.

As noted above, each computing node's virtual memory space can be mapped to the combination of the computing node's local physical memory as well as a remote computing node's physical memory. In some implementations, static virtual memory partitioning is performed (where, after the initial partitioning, the allocation of physical memory to the virtual memory spaces is not changed). In other implementations, dynamic virtual memory repartitioning can be performed (after the initial partitioning) in response to one or more policies, such as quality of service (QoS) policies, denial-of-service (DoS) prevention policies, usage policies, and power management policies.

In some embodiments, memory partitioning can also enable the use of heterogeneous memories. Some computing nodes can employ physical memories of different types from physical memories of other computing nodes. For example, a first computing node can employ low-power memory, whereas a second computing node can employ high-power memory. As other examples, low-cost or low-density memories can be used in some computing nodes, while high-cost or high-density memories can be used in other computing nodes. The memory partitioning according to some embodiments can allow different combinations of heterogeneous types of memories to be used by computing nodes, such that different types of the memories can be assigned to different computing nodes.

FIG. 1 illustrates a server ensemble 100 that includes multiple server nodes 102, 103. The server ensemble is an example of the "system" referred to above and the server nodes are examples of the "computing nodes" referred to above. More generally, a "computing node" can refer to any one of a computer, storage system, communication system, or other type of device that is capable of performing computing or processing tasks. Each "computing node" is a distinct unit of processing and other hardware components. For example, in a server ensemble, each server node can be a server blade having its own housing that encloses processing and other hardware components. As depicted in FIG. 1, two of the server nodes (102, 103) of the server ensemble 100 are depicted. In other implementations, additional server nodes can be provided.

A "server ensemble" refers to an arrangement of server nodes that are able to communicate with each other. In some example implementations, a server ensemble is a server rack or cabinet that has an external housing defining an inner space to contain the server nodes.

Each of the server nodes 102, 103 includes one or more central processing units (CPUs) 104, which are connected to a system bus 106 inside the corresponding server node. The system bus 106 is connected to a memory controller 108, which manages access of local memory 110 in the server node 102.

The memory controller 108 is connected to an input/output (I/O) controller 112, which is connected to various I/O devices 114, such as disk drive controllers, universal serial bus (USB) devices, and so forth. The I/O controller 112 is also connected to a network interface controller 116 to allow the server node to communicate over a shared communication network 118 (such as a local area network, e.g., Ethernet network, or some other type of network) of the server ensemble 100.

A dashed line 120 between server nodes 102 and 103 indicates that one server node 102 can access the memory of another server node 102 (or vice versa) over the communications network 118 by using a remote access mechanism, such as a remote direct memory access (RDMA) mechanism. RDMA allows data to move from the memory of one server node to the memory of another server node without involving either server node's operating system. RDMA is used to allow for efficient sharing of physical memories among the server nodes. In other implementations, other access mechanisms can be used to allow for sharing of physical memories of multiple server nodes.

Also depicted in each of the server nodes is a management processor 122, which is depicted as being connected to the I/O controller 112. In other implementations, the management processor 122 can be connected to other components within a server node.

In accordance with some embodiments, the management processors 122 of the various server nodes 102 can cooperate to perform virtual memory partitioning, in which the global memory pool including the physical memories 110 of the server nodes can be arbitrarily allocated to partitions corresponding to the server nodes. In a different implementation, instead of using the management processors 122 distributed across the server nodes, a central controller 124 can be used to perform the memory partitioning according to some embodiments. The central controller 124 can be separate from the server nodes or can be part of one of the server nodes. In yet another embodiment, the central controller can cooperate with the management processors 122 to perform the virtual memory partitioning.

The management processor 122 and/or central controller 124 are part of a management infrastructure of the server ensemble 100. The management processor 122 and/or central controller 124 have virtual memory partitioning firmware 126 (in the form of code stored locally in the read-only memory or programmable/erasable read-only memory of the central controller 124 and/or management processors 122) that is able to perform the virtual memory partitioning according to some embodiments. Such local memory for storing firmware is represented as memory 123 in each management processor 122, and memory 125 in the central controller 124. The virtual memory partitioning firmware 126 is executed during a boot sequence, prior to operating system loading. The firmware 126, as depicted in FIG. 1, includes a virtual memory partitioning module 128, a virtual memory mapping module 130, a virtual memory power management module 132, and a memory usage monitor 134. These modules are discussed further below.

Also depicted in FIG. 1 is the software 136 of each server node. The software 136 includes application software 138, libraries 140, an operating system 142 (and its associated components, such as device drivers and file system control logic), and a virtual machine monitor (VMM) 144. A VMM manages sharing of resources of a physical machine (e.g., server node 102 or 103) by multiple virtual machines executable in the physical machine. A "virtual machine" refers to some partition or segment of the physical machine that is provided to virtualize or emulate a physical machine. The VMM 144 virtualizes the physical resources of the physical machine to enable sharing of such resources. In other implementations, the VMM 144 can be omitted.

Figure 2:
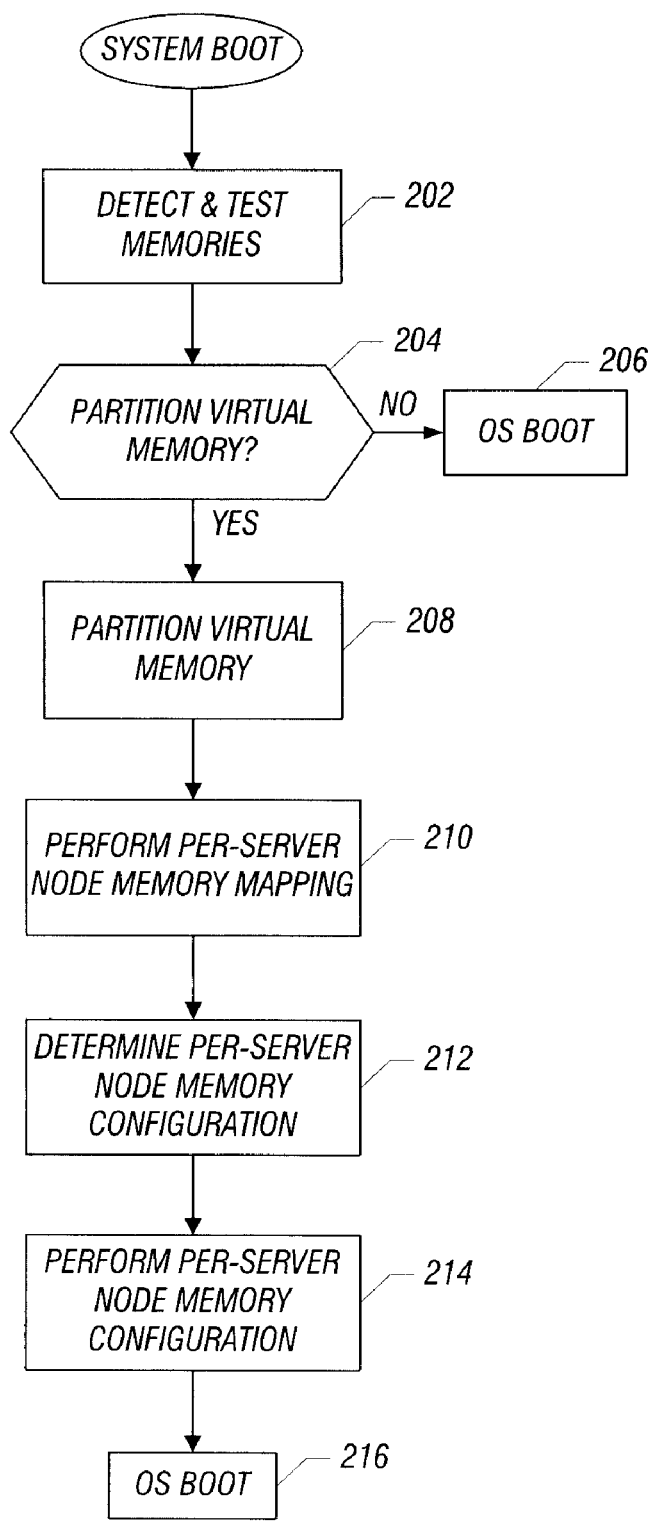
FIG. 2 is a flow diagram of a system-boot procedure in which memory partitioning is performed according to an embodiment.

FIG. 2 shows a system boot sequence for the server ensemble 100 of FIG. 1. The system boot sequence includes detecting and testing (at 202) the physical memories in the server nodes. Next, the system (and more specifically, the firmware 126) determines (at 204) whether virtual memory partitioning according to some embodiments is to be performed (which can be indicated, for example, by setting a flag or some other indicator stored in non-volatile memory). If not, then a normal operating system boot can be performed (at 206).

However, if the firmware 126 detects (at 204) that virtual memory partitioning is to be performed, then the firmware proceeds to partition (at 208) the virtual memory spaces of the corresponding server nodes 102. The global memory pool of physical memories 110 can be arbitrarily partitioned between server nodes or groups of server nodes. In some implementations, the partitioning of the virtual memory spaces can be based on user input received by the virtual memory partitioning module 128 in the firmware 126. For example, the virtual memory partitioning module 128 can provide, in a user interface 126 (FIG. 1), representation of the memory resources of the server ensemble 100 to allow the user to partition the aggregate physical memory resource pool into different virtual memory spaces. The user interface 126 in FIG. 1 can be a user interface (e.g., graphical user interface) presented in a display device connected to the server ensemble 100. Alternatively, the user interface 126 can be presented in a remote computer coupled to the server ensemble 100 over a network. Alternatively, the partitioning of the global memory pool can be performed automatically based on preset criteria that are stored in the server ensemble 100.

Next, per-server node virtual memory mapping is performed (at 210). In performing this mapping, each server node's virtual memory space can be mapped to a combination of the server node's local physical memory and a remote server node's physical memory (or multiple remote server nodes' physical memories). Note that some of the server nodes may be allocated just the server node's local physical memory, and not the physical memory of a remote server node.

The configuration of each server node's memory is then determined (at 212), which involves determining various characteristics of the physical memories allocated to the particular server node (e.g., memory speed, memory size, etc.).

Next, the firmware 126 performs (at 214) per-server node RDMA memory registration, which defines, for each server node, where data pages will be located to enable RDMA operations. A "data page" or "page" refers to some logical block of a memory (or memories). Since the system is already aware of the virtual memory partitioning, pre-registration for RDMA operations can be performed in the boot sequence in FIG. 2.

Next, the operating system is booted (at 216), which involves loading of the operating system and execution of the operating system.

As depicted in FIG. 2, the tasks 202, 204, 208, 210, 212, and 214 are performed during the boot sequence prior to operating system loading. These tasks include the virtual memory partitioning and mapping (208 and 210), which enables for more efficient partitioning of the global memory pool into virtual memory spaces according to some embodiments. Efficiency and software transparency are enhanced since the operating system and other software do not have to be involved in performing the partitioning and mapping.

Figure 3:
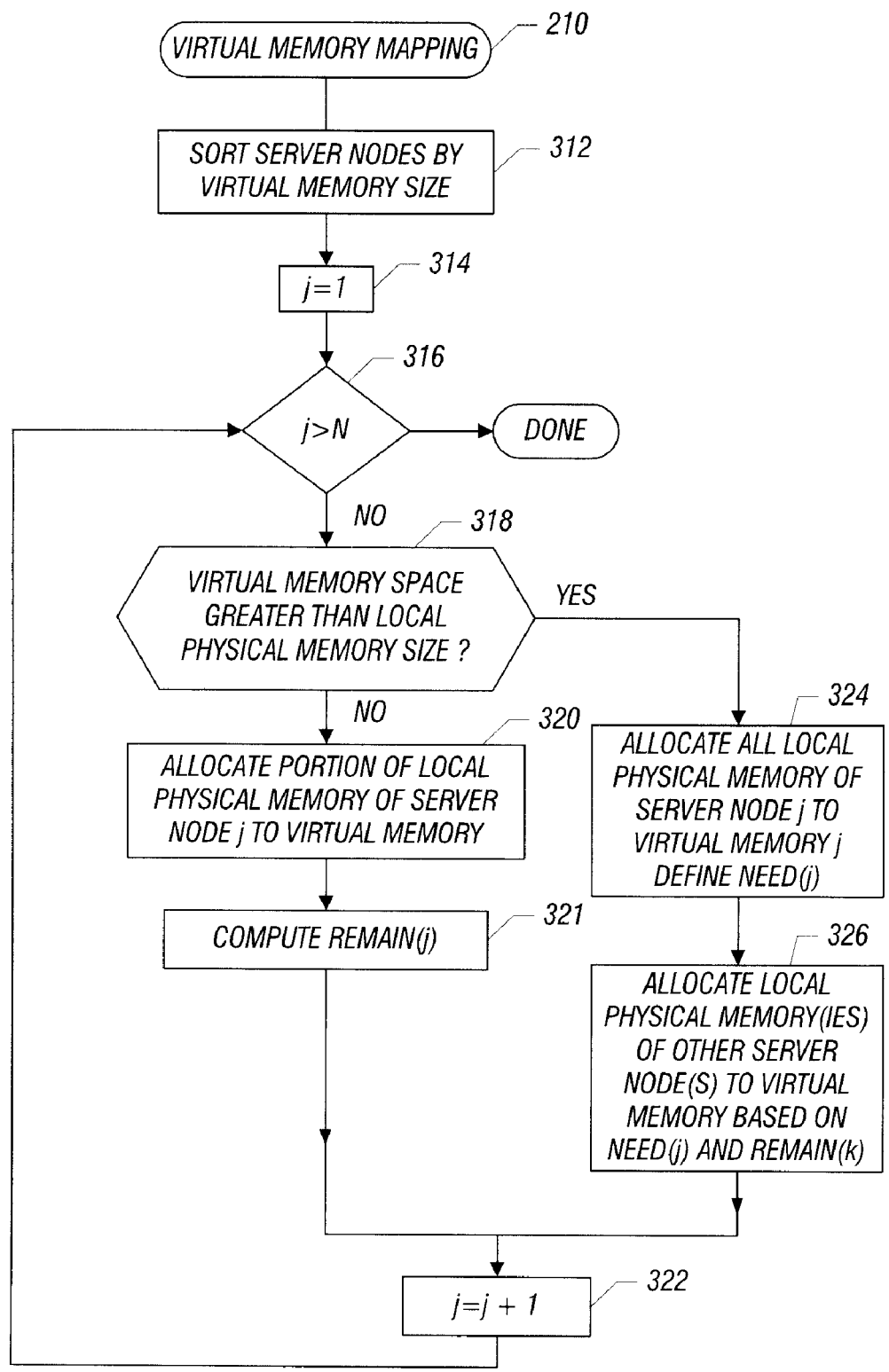
FIG. 3 is a flow diagram of a virtual memory-mapping algorithm used in the memory partitioning according to an embodiment.

FIG. 3 illustrates virtual memory mapping (task 210 in FIG. 2) for server nodes in the server ensemble 100. Initially, a parameter N is defined as the total number of server nodes in the server ensemble 100. The server nodes are sorted (at 312) by virtual memory size. This sorting allows for the server node with the smallest virtual memory size to be processed first. Different sortings can be performed in other embodiments. A variable j is set equal to one (at 314) to start processing of the server node with the smallest virtual memory space. If j is greater than N, as detected at 316, then all server nodes have been processed and the virtual memory mapping process is complete. However, if j is not greater than N, then the mapping module 130 determines (at 318) if the virtual memory space (as set at 208 in FIG. 2) of server node j is greater than the local physical memory size of server node j. If not, then the local physical memory of server node j is large enough to completely satisfy the virtual memory for server node j. As a result, at least a portion of the local physical memory of server node j is allocated (at 320) to the virtual memory space of server node j.

After allocation of at least a portion of the local physical memory to the virtual memory space for server node j, the size of the remainder (non-allocated portion) of the local physical memory of server node j is defined (at 321) in a parameter called Remain(j). Remain(j) defines the remaining available physical memory space of server node j which can be used for allocation to virtual memory spaces of other server nodes (discussed further below). Next, the variable j is incremented (at 322), and the process proceeds to the next server node.

If it is determined at 318 that the virtual memory space for server node j is greater than the local physical memory size, then all of the local physical memory of server node j is allocated (at 324) to the virtual memory space of server node j. Also, a parameter Need(j) is defined that is equal to the difference between the virtual memory space and the local physical memory size of server node j. This parameter Need(j) indicates the amount of physical memory that is to be allocated from other server node(s) for server node j.

Next, the mapping module 130 proceeds to allocate (at 326) physical memory portions from one or more other server nodes k based on the value of Need(j) and the value of the parameter Remain(k) for each of the other server nodes k (k≠j). The value of Remain(k) allows the mapping module 130 to determine the amount of physical memory space that is available in each server node k.

Basically, portion(s) of the physical memories of the other server node(s) k are allocated to the virtual memory space for server node j until the virtual memory is satisfied.

Next, the variable j is incremented (at 322) to process the next server node. In this way, according to an embodiment, starting with the server node with the smallest virtual memory space, the virtual memory space of each of the other server nodes is mapped to corresponding physical memory portions.

According to some embodiments, virtual memory repartitioning can be performed based on one or more policies, such as a memory usage policy, QoS policy, DoS prevention policy, power management policy, and so forth. Repartitioning virtual memory refers to either increasing or decreasing the size of virtual memory, and re-mapping physical memories to the modified virtual memory (by adding or removing physical memory portions).

Figure 4:
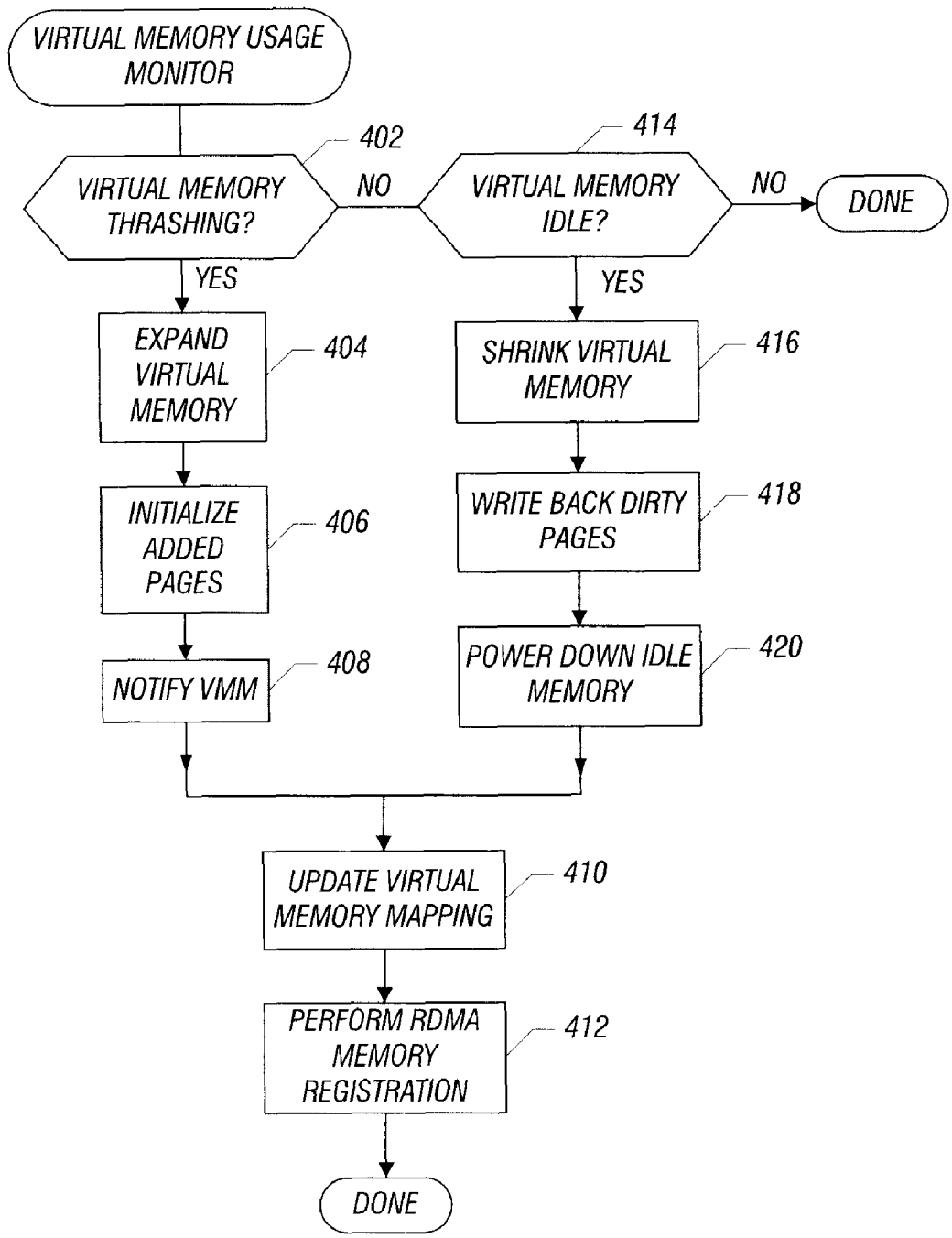
FIG. 4 is a flow diagram of a virtual memory repartitioning procedure, according to an embodiment.

Usage-based virtual memory repartitioning is depicted in FIG. 4. Usage of a virtual memory space is monitored by the virtual memory usage monitor 134 depicted in FIG. 1.

The usage monitor 134 determines (at 402) if virtual memory thrashing is occurring. "Virtual memory thrashing" refers to excessive swapping of data pages between memory and persistent storage, which can adversely affect system performance. Excessive thrashing can be defined as a number of data swaps between memory and persistent storage in some predefined time window that is greater than a predefined threshold. Other definitions of excessive thrashing can be used in other implementations. If excessive thrashing is detected at 402, then virtual memory expansion is performed (at 404), where some additional amount of physical memory is added to the virtual memory space of the server node. The added amount of physical memory can be some predefined incremental amount, and can be from local physical memory (if available) or remote physical memory.

The added amount of memory can be defined as a predefined number of pages to be added, or can be defined as some dynamically adjustable number of pages. The added pages are initialized (at 406), and the virtual machine monitor 144 is notified (at 408) of the expanded virtual memory space. Next, the virtual memory space mapping is updated (at 410) by adding additional physical memory portions to the expanded virtual memory space. Next RDMA memory registration is performed (at 412) in view of the added pages.

If it is determined (at 402) that excessive thrashing is not present, then the usage monitor 136 determines (at 414) whether there is excessive idling of physical memory(ies) in the virtual memory space. Excessive idling can be defined as a physical memory portion in the virtual memory being idle for greater than some predefined time duration. If excessive idling is present, then the firmware 126 performs (at 416) virtual memory shrinking, by some predefined or dynamically adjustable incremental size. Any dirty data in the affected part of the virtual memory (the part being removed from the virtual memory) is written back to persistent storage (at 418). Then, the idle physical memory portion can be powered down (at 420). Thereafter, the virtual memory update (410) and RDMA memory registration (412) can be performed in response to the shrinking of the virtual memory space of the particular server node.

Note that if it is detected that virtual memory thrashing or virtual memory idling is not occurring, as detected by the usage monitor 136 at 402 and 414, then no repartitioning has to be performed.

Note that information collected by the usage monitor 136 can also be used to perform workload characterization and modeling (in which characteristics of a workload are determined and possibly modeled by developing a model).

Excessive thrashing and excessive idling are just examples of criteria that are considered in expanding or shrinking the virtual memory space of the particular server node. Other criteria can be considered, such as QoS criteria or DoS criteria. For example, if a predefined quality of service for a particular server node (or workload) cannot be satisfied, then the virtual memory space for the particular server node can be expanded. In this manner, workloads having higher memory demands can be allocated a larger virtual memory. Also, if it is detected that some access pattern of a particular server node indicates that a DoS attack is occurring, then the virtual memory space can be shrunk to prevent the DoS attack from consuming too much of the server node's resources. In this manner, attack isolation can be performed, and trust that a server node has not been compromised as a result of being attacked is enhanced.

Figure 5:
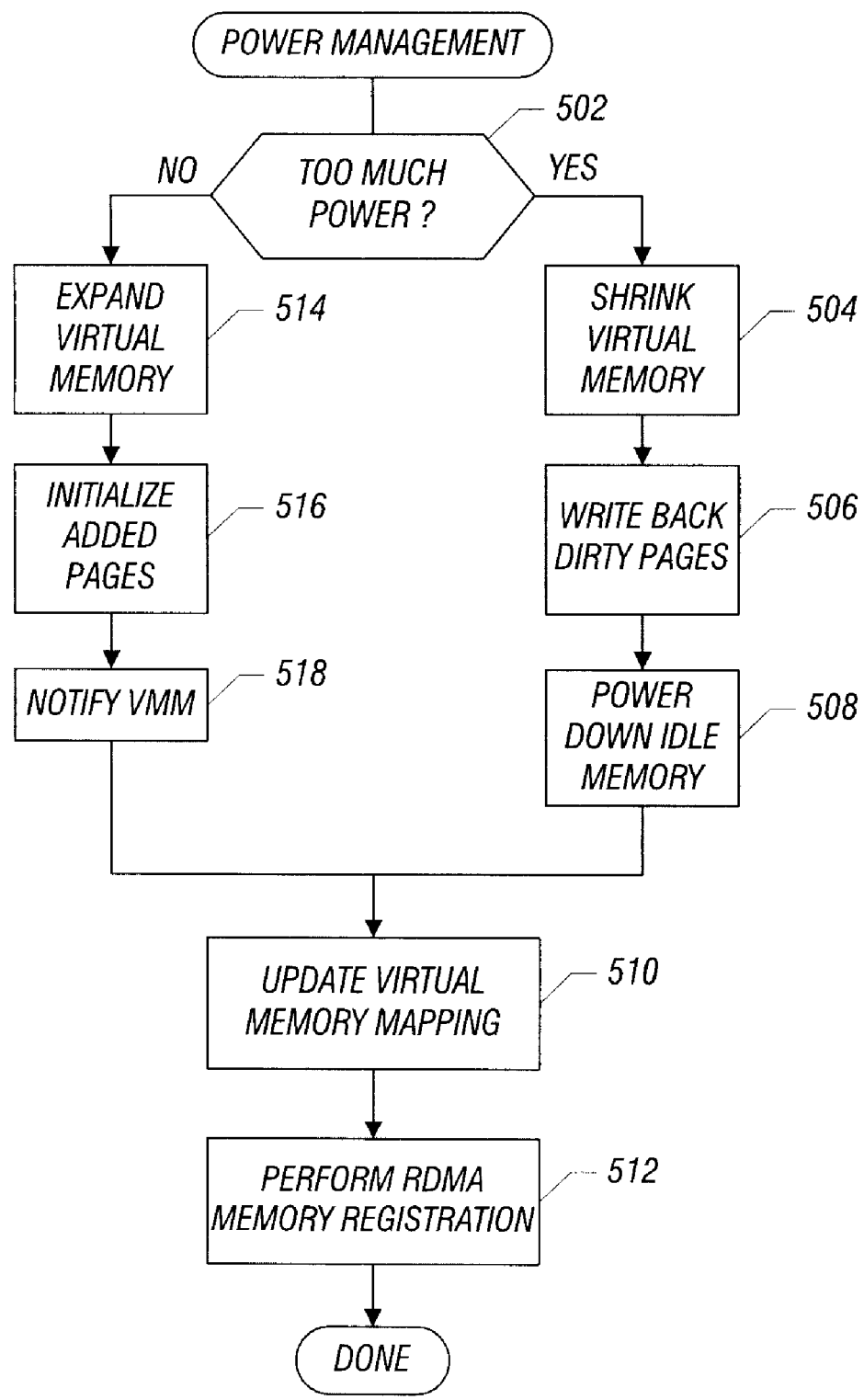
FIG. 5 is a flow diagram of a power management procedure that triggers virtual memory repartitioning, according to an embodiment.

FIG. 5 illustrates a procedure performed by the virtual memory power management module 132 (FIG. 1). The power management module 134 determines (at 502) if too much power is being consumed in a particular server node. "Too much power" is defined as power consumption exceeding some predefined threshold. If too much power is being consumed, then virtual memory space shrinking is performed (at 504). The remaining tasks (506, 508, 510, and 512) are the same as tasks 418, 420, 410, and 412, respectively (depicted in FIG. 4).

If the power management module 132 determines that too much power is not being consumed, then virtual memory spaced can be expanded (at 514). The remaining tasks (516, 518, 510, and 512) are the same as tasks 406, 408, 410, and 412, respectively, in FIG. 4.

One example application of the power management scheme discussed above is that bank-level memory power management can be performed, in which idle memory banks can be powered down.

Although reference has been made to a server ensemble 100 that has a shared communications network among the server nodes, it is noted that techniques of sharing a global memory pool as described herein can be applied to other arrangements, where computing nodes are more loosely coupled (such as over multiple communications networks).

According to other embodiments, the memory-sharing and partitioning mechanism can be used to build a virtualized memory appliance from commodity servers. High availability can be achieved by replicating data in redundant memory modules accessed by redundant memory controllers across participating servers.

In yet other embodiments, the memory-sharing and partitioning mechanism can be used to allocate the total memory resource between locally and globally available memories to match a parallel application's local versus global memory demands. In other words, for a parallel application that is executed on multiple computing nodes, the partitioning firmware 126 according to some embodiments can detect the local memory demand for this parallel application, as well as the global memory demand (memory of a remote server), and based on such detection, can allocate local memory resources and global memory resources accordingly.

Additionally, physical memory resources can be allocated between different virtual machine groups (e.g., between different research labs or departments) to achieve performance and fault isolation.

Code of the firmware 126 described above is loaded for execution on a controller (e.g., processor, ASIC, PGA, microcontroller, etc.). A "controller" can refer to a single component or to plural components.

As noted above, the code can be implemented on a storage medium of the controller, where the storage medium is a computer-readable or computer-usable storage medium. Such code can be executed by the controller.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method of sharing a memory pool that includes at least one physical memory in at least one of plural computing nodes of a system, the method comprising:
   partitioning, using firmware in management infrastructure of the system, the memory pool into memory spaces allocated to corresponding ones of at least some of the computing nodes; and
   mapping, using the firmware, portions of the at least one physical memory to the memory spaces, wherein at least one of the memory spaces allocated to a particular one of the computing nodes includes a physical memory portion from another one of the plural computing nodes.

2. The method of claim 1, wherein the partitioning and mapping are performed by the firmware that includes at least one management processor in at least one of the computing nodes.

3. The method of claim 1, wherein the partitioning and mapping are performed by a central controller in the system.

4. The method of claim 1, wherein the computing nodes include server nodes that are part of a server ensemble, the server nodes being interconnected by a communications network within the ensemble, the method further comprising:
   the particular computing node allocated to the at least one memory space accessing physical memory in another computing node over the communications network, wherein the accessed physical memory is part of the at least one memory space.

5. The method of claim 4, wherein the particular computing node accessing the physical memory in another computing node comprises accessing using a remote direct memory access (RDMA) operation.

6. The method of claim 1, wherein the at least one memory space allocated to the particular computing node includes physical memory portions from a plurality of the computing nodes.

7. The method of claim 1, further comprising:
   dynamically re-mapping portions of the at least one physical memory to the memory spaces according to at least one policy.

8. The method of claim 7, wherein dynamically re-mapping portions of the at least one physical memory to the memory spaces comprises dynamically re-mapping according to at least one policy selected from among a quality-of-service policy and a denial-of-service prevention policy.

9. The method of claim 7, wherein dynamically re-mapping portions of the at least one physical memory to the memory spaces comprises dynamically re-mapping according to a power management policy.

10. The method of claim 9, wherein dynamically re-mapping according to the power management policy comprises removing a particular portion of the at least one physical memory from the memory space of a computing node if the particular physical memory portion has been idle for greater than a predetermined time period.

11. The method of claim 9, wherein dynamically re-mapping according to the power management policy comprises reducing amounts of one or more physical memory portions mapped to the memory spaces to reduce power consumption of the system.

12. The method of claim 7, wherein dynamically re-mapping portions of the at least one physical memory to the memory spaces comprises re-mapping based on monitoring of usage of the memory spaces.

13. The method of claim 7, wherein dynamically re-mapping portions of the at least one physical memory to the memory spaces comprises re-mapping based on detection of physical memory portions that are idle or that are experiencing thrashing.

14. The method of claim 1, wherein mapping portions of the at least one physical memory to the memory spaces comprises mapping portions of the at least one physical memory to the memory spaces of the computing nodes in an order starting from a smallest memory space.

15. The method of claim 1, wherein the partitioning and mapping using the firmware are performed prior to loading of an operating system.

16. The method of claim 1, wherein the system has a parallel application executing on the computing nodes, and wherein the partitioning and mapping are based on demands for memory by the parallel application.

17. A system comprising:
   a plurality of computing nodes having respective physical memories;
   a controller to:
      partition a memory pool that includes the physical memories of the computing nodes into virtual memory spaces allocated to corresponding ones of the computing nodes; and
      map the physical memories to the virtual memory spaces, wherein at least one of the virtual memory spaces includes physical memories from a plurality of the computing nodes.

18. The system of claim 17, further comprising an operating system, wherein the controller performs the partitioning and mapping prior to loading of the operating system.

19. The system of claim 17, wherein the controller is configured to re-map the physical memories to the memory spaces in response to at least one policy selected from among a quality-of-service policy, a denial-of-service prevention policy, a power management policy, and a usage monitoring policy.

20. The system of claim 19, wherein the re-mapping comprises one of shrinking a memory space and increasing a memory space.

21. The system of claim 17, wherein the physical memories include heterogeneous types of physical memories, and wherein the partitioning and mapping enables assignment of different ones of the heterogeneous types of physical memories to different computing nodes.

22. A controller for use in a system having a plurality of computing nodes, wherein the computing nodes contain respective physical memories that make up a memory pool, the controller comprising:
   a storage medium containing firmware to cause the controller to:
      partition the memory pool into memory spaces allocated to corresponding ones of the computing nodes; and
      map the physical memories to the memory spaces, wherein at least one of the memory spaces allocated to a particular one of the computing nodes includes physical memories from a plurality of the computing nodes.

23. The controller of claim 22, wherein the firmware further causes the controller to further:
   re-map the physical memories to the virtual memory spaces according to at least one policy selected from among a quality-of-service policy, a denial-of-service prevention policy, a power management policy, and a usage monitoring policy.

* * * * *